J. P. W. Riley.
Hay Fork.
Nº 65,277.      Patented May 28, 1867.
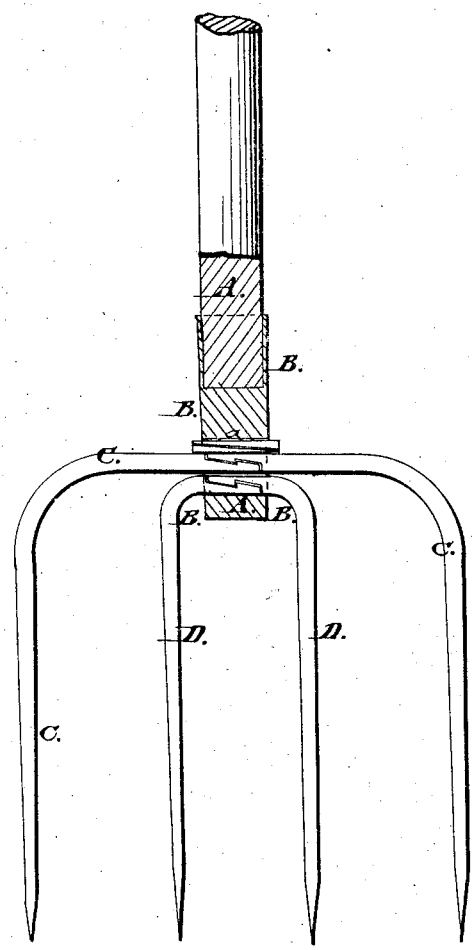
Witnesses:
Theo. Tusche
J. C. Service
Inventor:
J. P. H. Riley
per Munn & Co.
Attorneys.

United States Patent Office.

J. P. W. RILEY, OF MONTROSE, PENNSYLVANIA.

Letters Patent No. 65,277, dated May 28, 1867.

---

MODE OF SECURING THE TINES OF FORKS AND RAKES TO THEIR HANDLES.

---

*The Schedule referred to in these Letters Patent and making part of the same.*

---

TO ALL WHOM IT MAY CONCERN:

Be it known that I, J. P. W. RILEY, of Montrose, Susquehanna county, Pennsylvania, have invented a new and improved Manner of Securing the Tines of Hay-Forks to the Handle; and I do hereby declare that the following is a full, clear, and exact description thereof, which will enable others skilled in the art to make and use the same, reference being had to the accompanying drawings, forming part of this specification, in which the drawing represents a plan or top view, partly in section, of my improved hay-fork.

This invention relates to a new manner of securing the tines or prongs of hay or manure-forks, rakes, potato-hooks, and other suitable articles to the handle. It consists in making and scarfing the same together, within a mortise or slot in the ferrule, and driving keys or wedges behind them, so that they will be securely fastened to the handle. Should one of the tines break it can be easily renewed without throwing all away.

A represents the handle of a hay or other fork, or other suitable implement. B is the ferrule, arranged around the lower end of the handle in the usual manner. A hole or slot is cut through the lower end of the handle or ferrule, as shown. C C are the tines of the hay-fork, which are made of steel or other suitable material. They are bent into suitable shape, and are united in the slot of the stock or handle with the tine on the other side of the handle by a scarf or other suitable joint, as is clearly shown in the drawing. They are then secured in the handle by means of keys or wedges $a\ a$, which are driven over the joint into the handle. The said handle may be provided with two slots, so that either two or four tines may be secured in the handle, as may be desired, or the slot through which the tines C pass is large enough to allow also the securing of the tines D in the slot for converting the hay-fork into a manure-fork. The tines D are secured in the handle in the same manner as the tines C. When the former are not used the lower part of the mortise is filled up with a block of suitable dimensions.

It is evident that this invention may be employed for many purposes, even for holding the head of rakes. In the latter case the teeth are fastened to cross-heads, which are secured in the handle in the same manner as the tines, and as has been described. The invention may also be used on potato-hooks, and on any other suitable device.

I claim as new, and desire to secure by Letters Patent—

1. Making the tines of a hay-fork in two parts, which are scarfed in a mortise in the handle or ferrule, and secured in a position by means of keys or wedges, substantially as herein shown and described.

2. In combination with the double tines C C, I claim the double tines D D, which, when inserted in the handle in the manner specified, will convert the device into a manure-fork, and can be removed whenever desired, substantially as herein shown and described.

J. P. W. RILEY.

Witnesses:
WM. F. MCNAMARA.
ALEX. F. ROBERTS.